US006086707A

United States Patent [19]

Waller

[11] Patent Number: 6,086,707

[45] **Date of Patent: *Jul. 11, 2000**

[54] METHOD FOR MAKING AN IDENTIFICATION DOCUMENT

[75] Inventor: Robert A. Waller, Rowlett, Tex.

[73] Assignee: Raytheon Company, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/608,658

[22] Filed: Feb. 29, 1996

[51] Int. Cl.[7] .......... B32B 31/00

[52] U.S. Cl. .......... 156/277; 156/241; 156/306.6; 156/235; 156/307.3; 40/158.1; 40/661; 40/159; 40/903

[58] Field of Search .......... 40/158.1, 661, 40/159, 903; 156/233, 220, 277, 234, 241, 307, 306.6, 291, 235, 307.3, 230

[56] References Cited

U.S. PATENT DOCUMENTS

| | | | |
|---|---|---|---|
| 4,322,461 | 3/1982 | Raphael et al. | 428/14 |
| 4,833,122 | 5/1989 | Doll et al. | 503/226 |
| 5,074,593 | 12/1991 | Grosso | 283/77 |
| 5,510,171 | 4/1996 | Faykish | 428/195 |
| 5,658,411 | 8/1997 | Faykish | 156/237 |

*Primary Examiner*—Merrick Dixon
*Attorney, Agent, or Firm*—Baker Botts, L.L.P.

[57] ABSTRACT

An identification document and a method of placing personalized data (variable text and color image) directly on the identification document having a data receiving page. The method includes the steps of: printing personalized data directly onto a silicone release coat of a release sheet; positioning the release sheet with the side containing fused toner adjacent to the adhesive of an adhesive side of a security laminate; passing the release sheet and the security laminate through a laminator to transfer the personalized data to the adhesive of the security laminate; removing the release sheet leaving the personalized data on the security laminate; and passing the security laminate and the data receiving page through a laminator to seal personalized data between the security laminate and the data receiving page.

8 Claims, 6 Drawing Sheets

METHOD FOR MAKING AN IDENTIFICATION DOCUMENT

TECHNICAL FIELD

This invention relates generally to identification documents and, more particularly, to identification documents and a method of placing personalized data (including text and image) in an identification document, such as a passport.

BACKGROUND OF THE INVENTION

There are usually two types of printing on identification cards and passports. The first type of printing involves background printing that includes reference and security information. For example, the reference information may include the issuing agency as well as numerical data. The security information may be in the form of a watermark, an encoded magnetic strip, numerical sequences, a holographic image, etc. The second type of printing includes "personalized data" or "variable information" such as photographic, fingerprint, signature, name, address, etc.

Personalized text and image data is placed into most current passports by printing text directly into the booklet on a data receiving page with a daisy wheel-like printer and then affixing a photograph of the passport holder to the data page. This produces a passport that is vulnerable to photo-substitution. According to many forensic experts, photo-substitution accounts for over seventy percent of the incidents of passport tampering and alteration. Recent improvements in digital printing technology offer a potential method for countering this photo-substitution threat. New digital full-color printers produce near photographic quality images and passports produced with this technology offer enhanced levels of security because the images are considerably more difficult to remove and alter as compared to the photograph counterpart.

Several means of placing the variable text and image data into the passport booklet have been proposed in the past few years. One technique is based on an insert page concept. A sheet of security paper such as that used to make currency or a special synthetic paper such as Teslin is preprinted with an appropriate passport security background. The finished sheet is die cut to the dimensions of the passport creating an insert data page. This data page is positioned into the passport and then attached to the booklet via a thermal lamination process. A security laminate, which is sewn into the booklet during the fabrication process, holds the data page in the document. While this technique does provide a method of placing the variable text and color image data into the passport, it also introduces a new point of vulnerability. The entire data page can be removed from the booklet by attacking the security laminate.

SUMMARY OF THE INVENTION

In accordance with the present invention, an identification document, e.g. a passport, is prepared by a method including printing personalized data directly onto a silicone release coat of the release sheet using a printer having a maximum and minimum fusing temperature, wherein the fusing temperature of the printer is controlled such that the maximum fusing temperature is below the point that the print toner will become brittle when the printed sheet is flexed and such that the minimum fusing temperature is above the point required to adequately fuse the toner to the silicon release coat. The release sheet is positioned with the side containing fused toner adjacent to the adhesive of a security laminate. Next, the release sheet and the security laminate are passed through a laminator thereby transferring the personalized data to the adhesive of the security laminate. Following lamination, the release sheet is removed leaving the personalized data on the security laminate.

The present invention offers enhanced levels of passport security over previous methods because all of the primary components of the document including the security laminate and the data receiving page are sewn into the passport booklet during fabrication rather than being inserted when the variable text and data are added. The overall security of the document is greatly enhanced because neither the laminate nor the data receiving page can be removed from the passport booklet without cutting the booklet apart.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE INVENTION

Figure 1:
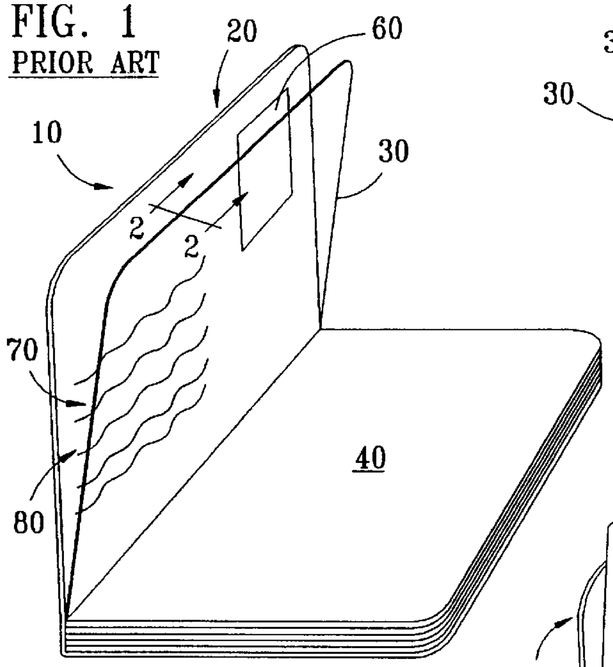
FIG. 1 PRIOR ART
FIG. 1 is a perspective view of a typical prior art passport booklet.
Figure 2:
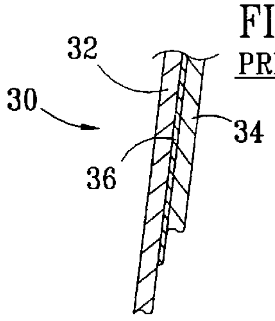
FIG. 2 PRIOR ART
FIG. 2 is an enlarged partial side view section of a security laminate page of the prior art passport booklet of FIG. 1.

Reference is now made to the Drawings wherein like reference characters denote like or similar parts throughout the 4F Figures. Referring to FIG. 1, therein is illustrated a current typical passport booklet 10. The current passport 10 configuration includes a data receiving page 80, usually of security paper affixed to the inside of the front cover 20, a die cut photograph 60 affixed to the data receiving page 80 and the variable text data 70 printed directly onto the data receiving page 80. A security laminate 30 is sewn into the passport booklet 10 to protect the document against wear and information substitution. After printing personalized data on the data receiving page 80 and attaching the photograph 60 to the data receiving page 80, the security laminate 30 is sealed to the receiving page 80 by passing the passport booklet 10 through a passport laminator. FIG. 2 illustrates that the typical security laminate includes a first layer of polyethylene based adhesive 32, a polyester cover 34 and a primer interface 36.

Although the description of the invention will proceed to make reference to a passport booklet, it should be understood that the invention relates to identification documents and the method of making such documents.

Figure 3:
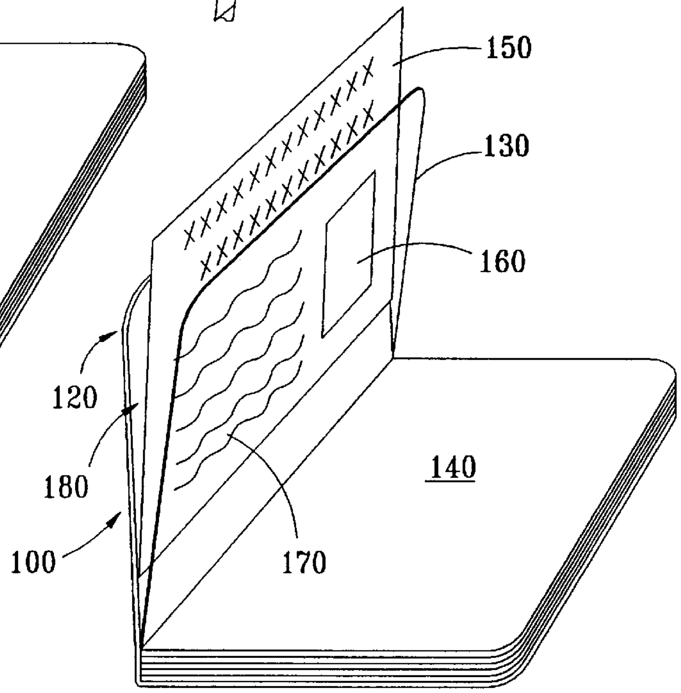
FIG. 3 is a perspective view an identification page of a passport booklet constructed according to a first embodiment of the present invention.

Referring now to FIG. 3, the present invention offers enhanced levels of security over other methods because all of the primary components of the passport booklet 100 including the security laminate 130 and the data receiving page 180 are sewn into the passport booklet during fabrication rather than being inserted when the personalized data is added. It is understood that sewing is not the only acceptable method of affixing the elements of the passport booklet 100, any method of affixing that provides a tamper resistant means preventing the removal or replacement of pages in the passport booklet 100 is satisfactory.

Figure 4:
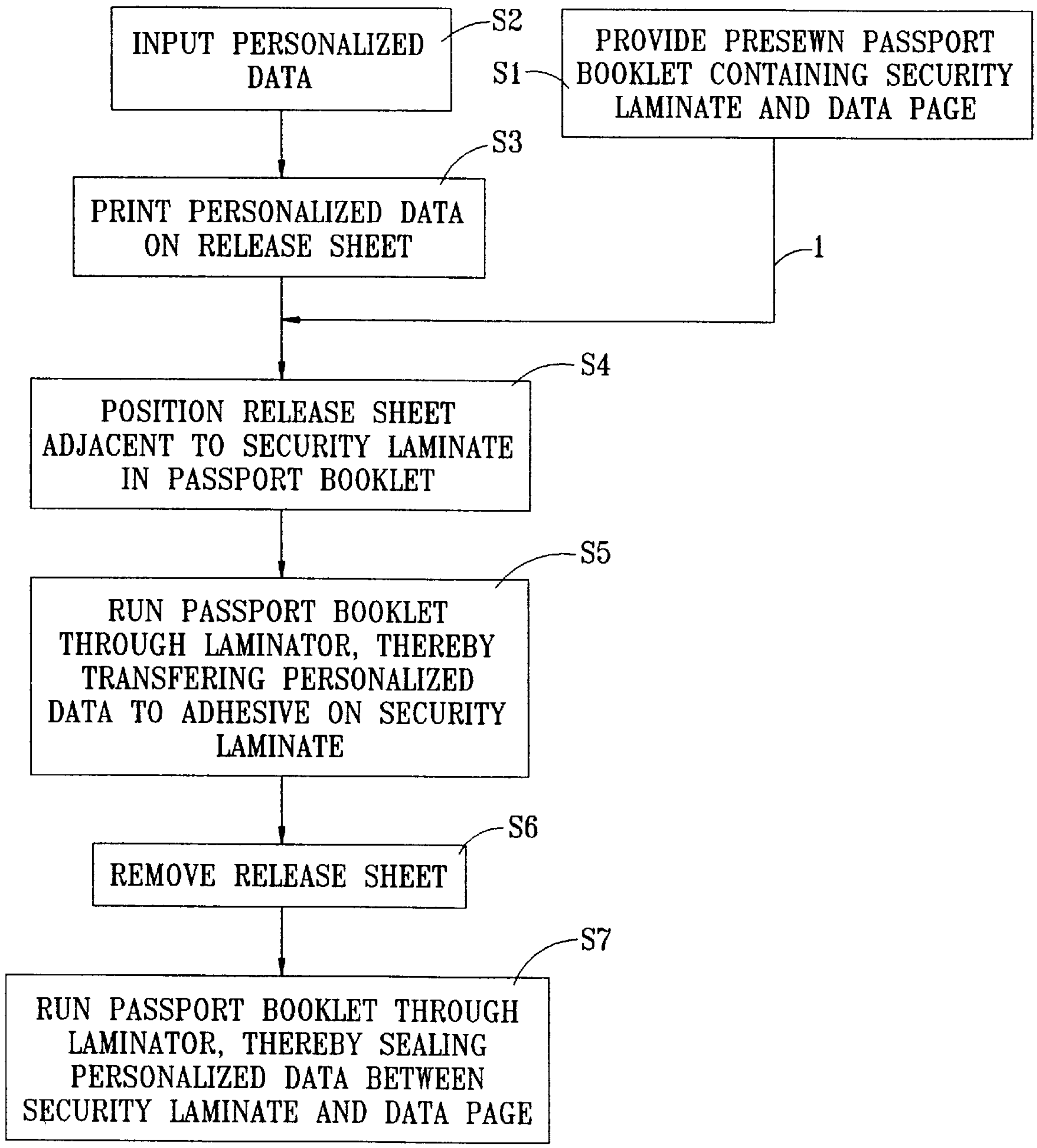
FIG. 4 is a flow chart showing the steps of the method of the present invention.

The steps employed in the method of the present invention are illustrated in FIG. 4 and described as follows. The presewn passport booklet 100 herein described above and illustrated in FIG. 3 is provided in Step S1. In the Step S2, formatted personalized data to be included in our identification page is input to a computer by various methods including using a scanning CCD array to read a signature or fingerprints, a computer keyboard for textual data, a scanner for scanning a photograph, using a frame grabber and video camera, and/or a digital camera. The data is digitized and downloaded to a printer.

Figure 5:
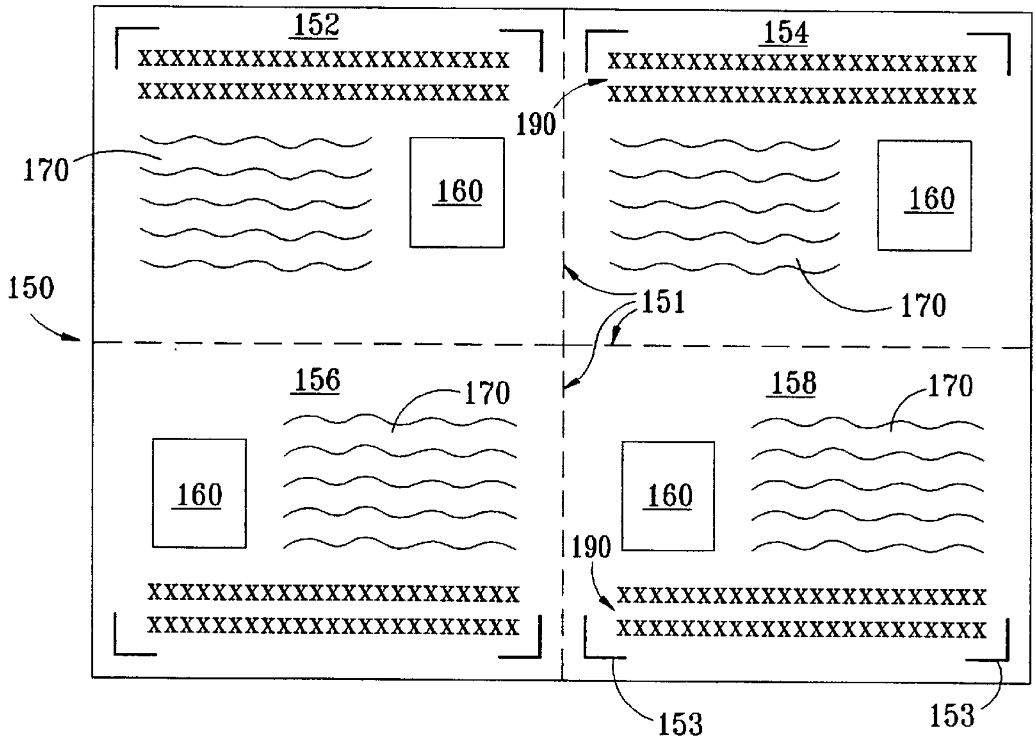
FIG. 5 is a plan view of a release sheet of the present invention after printing with personalized data for four separate individuals.
Figure 14:
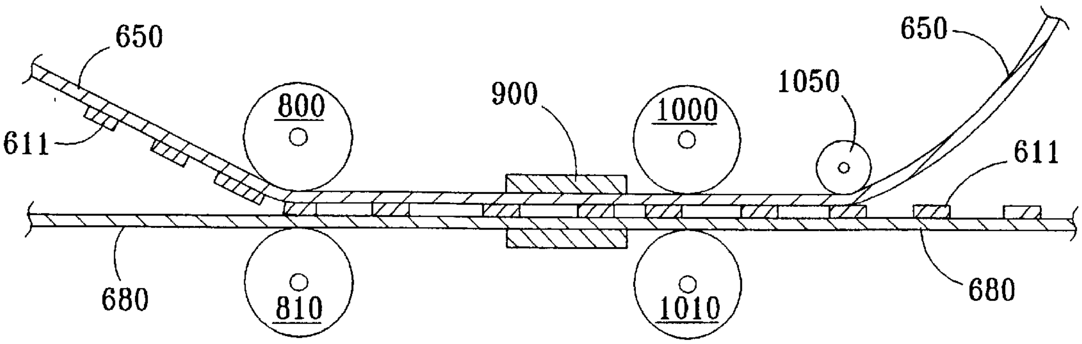
FIGS. 13 and 14 are side views of an apparatus for constructing the identification card of FIG. 12.

The personalized data is printed in positive image during Step S3 directly on a silicone release coat of a release sheet 150 (see FIG. 5). In one embodiment of the present invention, a black and white laser printer, such as the Hewlett-Packard Laserjet 4, was used to print black text and gray-scaled images while a color laser printer, such as the Ricoh NC5006, was used to print colored text and images. The Ricoh NC5006 prints color images and data directly onto the silicon release coat at the normal fuser roller pressures but improved quality images are achieved by slightly reducing the fuser roller temperature. Normal fusing temperatures cause the color laser toner to become brittle after fusing. This means that the toner will crack when the printed sheet is bent or flexed.

The best results to date have been achieved with a WC-40 STICK-NOT™ S-Premium silicon release sheet manufactured by Release International with a basis weight of 40.0 lbs./ream. The technical data for this release paper is provided below:

PHYSICAL TEST DATA (Typical Average Values)

| Characteristic | Test Method | Nominal Value | Nominal Value |
|---|---|---|---|
| Release | | | |
| (12"/min) | UM-502 | 5015 gm/in | 5–15 gm/25 mm |
| (1200"/min) | | 60–90 gm/in | 60–90 gm/25 mm |
| Basis weight | TAPPI T-410 | 40.0 lbs/ream | 65 g/m$^2$ |
| Caliper | TAPPI T-411 | 2.75 mils | 70 microns |
| Tear Strength CD | TAPPI T-414 | 53 grams | 53 grams |
| Tensile Strength MD | TAPPI T-404 | 23 lbs/in | 4.0 kN/m |
| Brightness | TAPPI T-452 | 82.0 nm | 82.0 nm |
| MG Sheffield Smoothness | UM-518 | 2.75 SFU | 2.75 SFU |

The best quality color images were achieved with this release sheet by reducing the fuser roller temperature to ~150° C. on the Ricoh NC5006 printer. Fusing temperatures that are too high will cause the toner to become brittle and crack when the sheet is flexed and temperatures that are too low do not adequately fuse the color toner to the release surface. However, at the proper fuser roller temperature setting, the fused information can be touched and lightly rubbed without smearing or destroying the text or images. The proper fuser temperature setting is dependent upon the thermal mass and, therefore, the basis weight of the release sheet.

FIG. 5 illustrates an example configuration of a printed silicon release sheet 150 showing the layout of the variable text and image data. In this configuration, the release sheet 150 is standard letter size of 8½"×11". This size is adequate to produce four individual passport documents 152, 154, 156, 158. The sheet 150 has perforated lines 151 so that it can be easily torn into the four equal quadrants 152, 154, 156, and 158 after the printing process. Personalized data including photographic image 160, textual image 170 and OCR-B machine readable text 190 are illustrated as printed on the release sheet.

Returning to FIG. 3 and 4 in Step S4, one of the quarter sheets, for illustrative purposes sheet 152, is placed between the data receiving page 180 and the security laminate 130. The security laminate 130 is positioned so that the adhesive side faces the data receiving page 180. The release sheet 152 is positioned so that the personalized information is facing the adhesive side of the security laminate 130.

Figure 6:
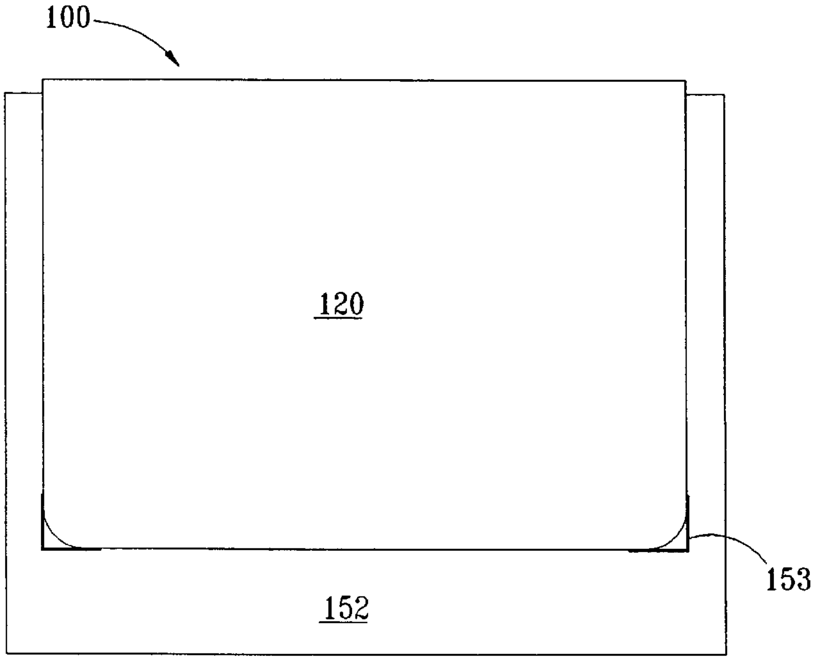
FIG. 6 is a plan view showing an alignment of the release sheet just prior to transfer of personalized information to the identification page.

Referring to FIGS. 5 and 6, alignment guides 153 are printed on each quarter sheet so that the text data 170 and image data 160 are positioned properly relative to the edges of the passport booklet 100.

The release sheet 150,including security laminate 130, are passed during Step S5 through a conventional laminator such as a 1000PLA from Thermal Laminating Corporation. The heaters are gapped to the approximate thickness of the passport booklet 100 and the temperature is adjusted to an interface temperature of 125° C. for typical polyethylene-based adhesives. The required interface temperature is dependent upon the adhesive formulation. The corresponding temperature setting on the laminator is dependent upon the thermal mass of the passport booklet 100 and, therefore, the thickness of the passport booklet 100 as well as the speed of the laminator. The laminator transfers the personalized data from the release sheet 150 to the adhesive of the adjacent security laminate 130. The personalized data including image and all of the text is transferred to the adhesive in a single pass rather than being printed directly to the laminate via a three-color or four-color print process.

While the donor release sheet 150 and security laminate 130 are still hot from the initial pass through the laminator, the release sheet 150 is peeled in Step S6 from the security laminate 130 and discarded.

After the image transfer is completed and the release sheet 150 is removed from the document, the passport booklet 100 is sent through the passport laminator a second time in Step S7 to seal the security laminate 130 to the data receiving page 180. In this embodiment, the data receiving page 180 is attached to the inside of the cover 120.

It is to be understood that the data receiving page 180 represents an identification document and may not be located in the passport booklet 100. Additionally, the data receiving page 180 may be a completely blank security coded paper or contain preprinted standard form information, leaving only blank space for the personalized data to be affixed. If the data receiving page is completely blank then the standard form information is downloaded to the printer concurrently with the personalized data and affixed concurrently as heretofore described with regard to the personalized data.

The method of the present invention is applicable to plain polyethylene hot melt adhesive as well as a number of copolymers including EAA (ethylene/acrylic acid copolymer), EEA (ethylene/ethyl acrylate copolymer), EMA (ethylene/acrylate copolymer), and EVA (ethylene/vinyl acetate copolymer). Furthermore, the process is not limited to hot melt adhesive applications. The transfer process can be used with pressure sensitive adhesives (PSA).

Figure 7:
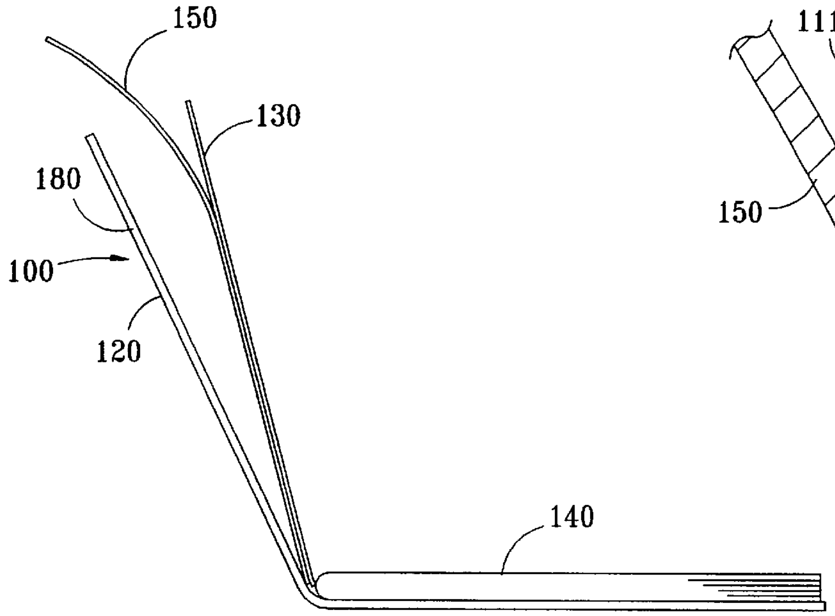
FIG. 7 is a side view of the identification page of the passport booklet of FIG. 3.
Figure 8:
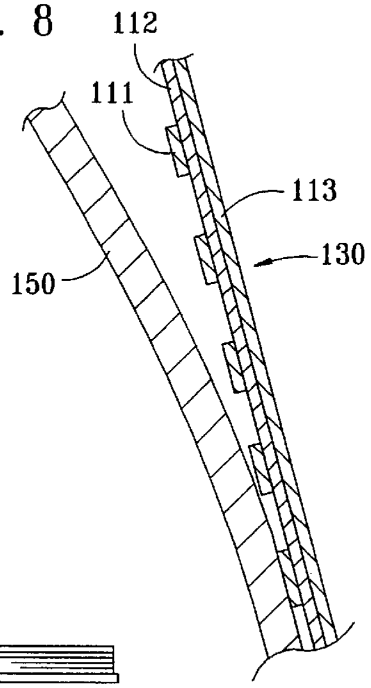
FIG. 8 is an enlarged partial side view section of a security laminate identification page of the passport booklet of FIG. 3.

FIGS. 7–11 illustrate cross sections of various possible identification document configurations. FIGS. 7 and 8 illustrate the configuration as previously described with regard to FIG. 3, just prior to the final lamination Step S7. FIGS. 7 and 8 illustrate the process as the silicon-coated release sheet 150 is removed from the security laminate 130. The final configuration of this example will result in the security laminate 130 being affixed to the data receiving page 180 that is affixed to the inside of the front cover 120.

FIG. 8 illustrates the silicon coated release sheet 150, printer toner 111 (consisting of approximately 90–95% polyester and 5–10% pigment), a polyethylene based copolymer adhesive 112, and a polyester security laminate cover 113.

Figure 9:
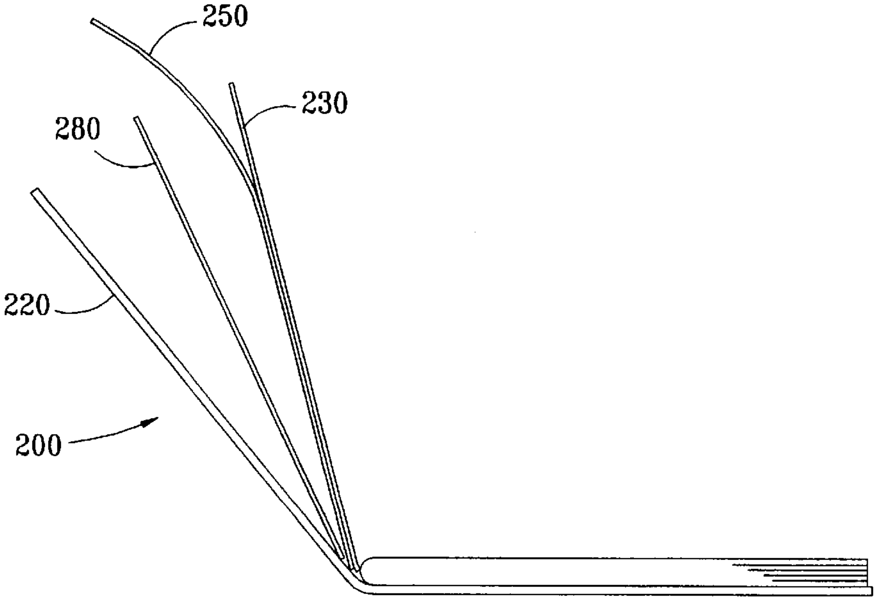
FIG. 9 is a side view of a passport booklet constructed according to a second embodiment of the method of the present invention.

FIG. 9 illustrates a second embodiment of the present invention, depicted at the same stage of the assembly as shown in FIG. 7 and 8. In this configuration, the security laminate 230 is sealed to an inner data receiving page 280 not affixed to the inside of the front cover 220 of the passport booklet 200. The location and side orientation of the data page 280 is determined by the placement of the security laminate 230 during the fabrication process.

Figure 10:
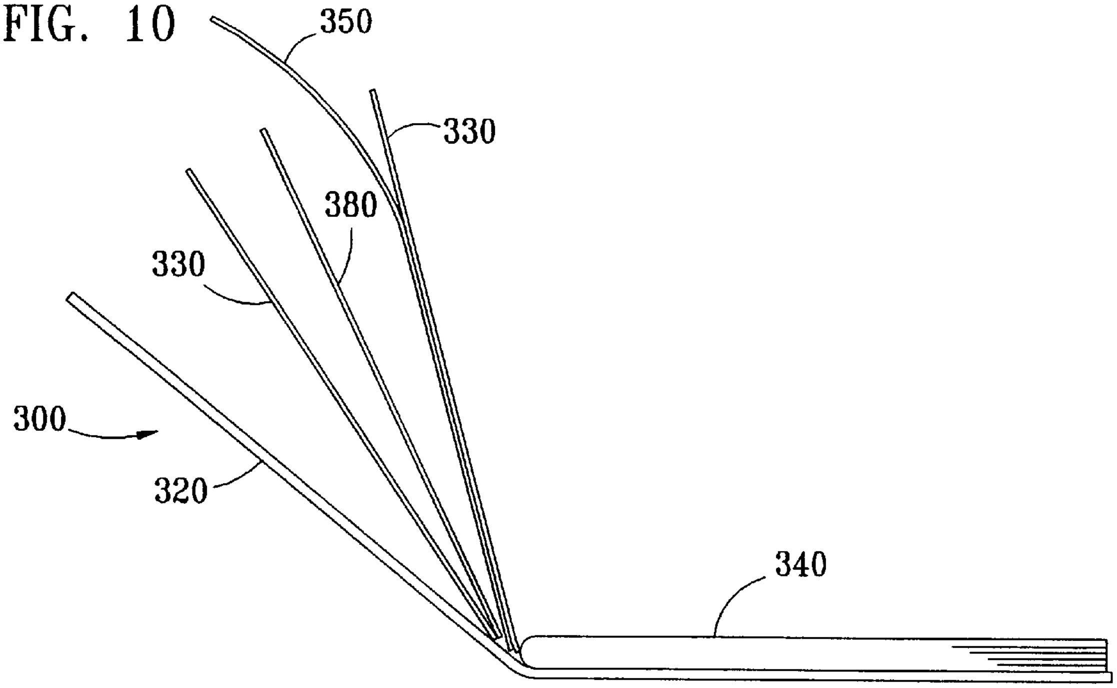
FIG. 10 is a side view of a passport booklet constructed according to a third embodiment of the method of the present invention.

FIG. 10 illustrates a third embodiment of the present invention. In this embodiment, the data receiving page 380 is sealed between two opposing layers of security laminates 330. Again, the location and side orientation of the data receiving page 380 is determined by the placement of the security laminates 330 during the fabrication.

Figure 11:
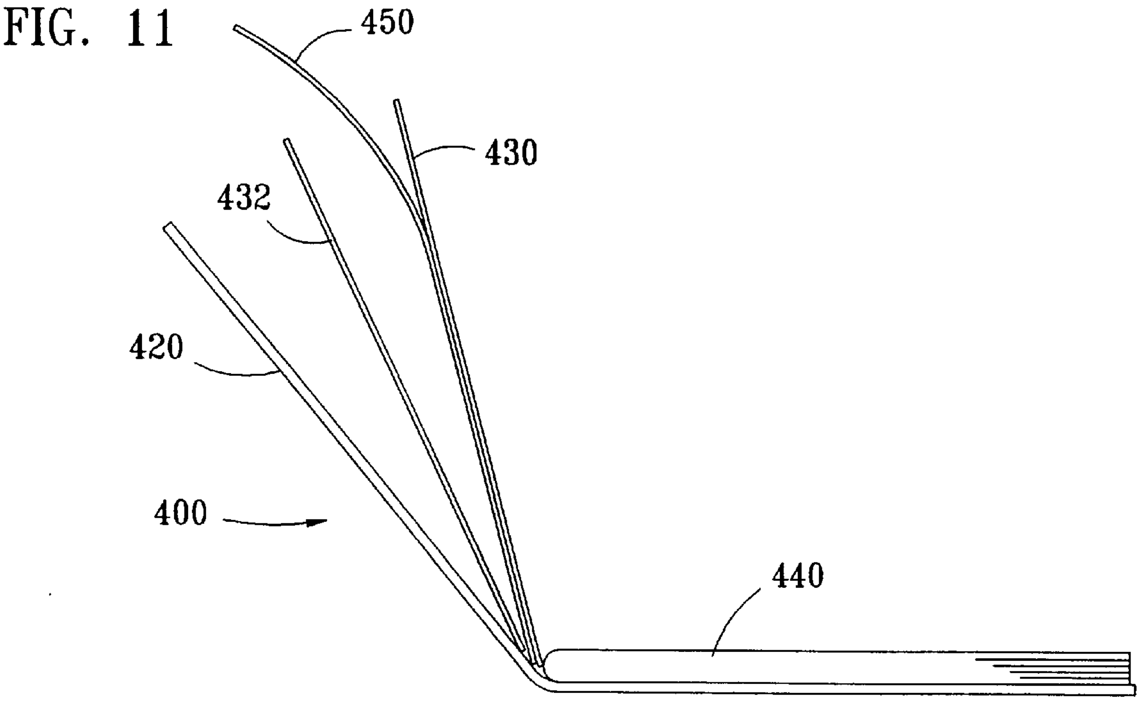
FIG. 11 is a side view of a passport booklet constructed according to a fourth embodiment of the method of the present invention.

A fourth embodiment is illustrated in FIG. 11. This embodiment does not utilize a data receiving page. Instead, the personalized data is transferred to a first security laminate 430 and then is sealed to a second security laminate 432. The personalized data is held in place between layers of adhesive of the opposing layers of security laminate 430 and 432.

Figure 12A:
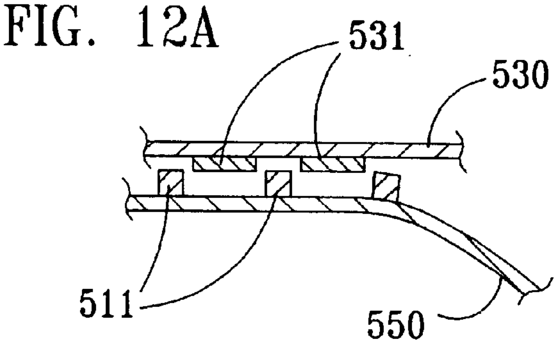
FIG. 12 is a side view of an identification card constructed according to an alternate method of the present invention.
Figure 12B:
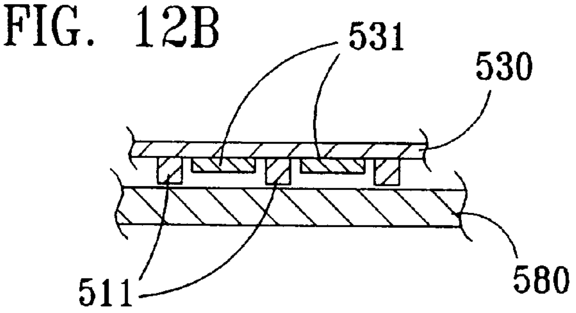
Figure 13:
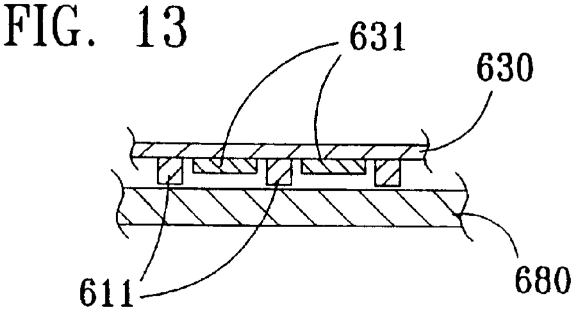

Referring to FIGS. 12 and 13, the invention, as explained, is applicable to identification documents 500. The personalized data associated with an identification document is printed in reverse onto sheets of the silicon-coated release material 550. The printed release sheet 550 is placed on a vinyl based substrate 530 and passed through a laminator at an interface temperature of 125°–150° C. When the release sheet 550 is peeled away from the vinyl substrate 530, laser printer toner 511 (comprising 90–95% polyester and 5 to 10% pigment is left on the vinyl substrate), thereby the personalized image is transferred to the substrate 530. The process has been demonstrated on release sheets 550 as large as 11"×17" which will accommodate 18–21 identification documents.

Apparatus for transferring personalized data to vinyl substrates is shown FIG. 13. A silicon coated donor release sheet 550 having personalized data printed in reverse is fed through rollers 800 and 810. Heat is applied by a heater 900 and pressure is applied by compression rollers 1000 and 1010. The release sheet 550 is removed from the vinyl substrate 530 by stripper rollers 1050, leaving the personalized data in a transfer positive image 511 on the vinyl substrate 530.

Although the preferred and alternative embodiments of the invention have been illustrated in the accompanying Drawings and described in the foregoing Detailed Description, it will be understood that the invention is not limited to the embodiment disclosed but is capable of numerous modifications without departing from the scope of the invention as claimed.

I claim:

1. A method of making an identification document having a data receiving page containing personalized data comprising the steps of:

printing the personalized data in the form of a fused toner directly onto a silicone release coat of a donor release sheet;

controlling the fusing temperature of the fused toner to maintain the fusing temperature below a level where the fused toner becomes brittle and above the fusing temperature required to fuse the fused toner to the silicone release coat;

positioning the donor release sheet with the side containing the fused toner in contact with an adhesive surface located on a security laminate;

laminating the donor release sheet and the security laminate to transfer the personalized data to the adhesive of the security laminate; and removing the donor release sheet from the security laminate.

2. The method of claim 1 further including the step of laminating the security laminate to the data receiving page with the adhesive surface containing the personalized data in contact with the data receiving page to seal the personalized data between the security laminate and the data receiving page.

3. A method of making a passport containing personalized data comprising the steps of:

providing a passport including:

a cover, a data receiving page attached to the cover, and a security laminate having an adhesive side;

printing the personalized data in the form of a fused toner directly onto a silicone release coat of a donor release sheet;

positioning the donor release sheet with the side containing the fused toner in contact with the adhesive side of the security laminate;

laminating the donor release sheet and the security laminate to transfer the personalized data to the adhesive side of the security laminate;

removing the donor release sheet from the security laminate;

positioning the security laminate into the passport with the adhesive side in contact with the data receiving page; and laminating the security laminate and data receiving page to seal the personalized data between the security laminate and the data receiving page.

4. The method of claim 3 wherein the step of printing the personalized data further includes:

controlling the fusing temperature of the fused toner to maintain the fusing temperature below a level the fused toner becomes brittle and above the fusing temperature required to fuse the fused toner to the silicone release coat.

5. A method of making an identification document having a data receiving page for personalized data comprising the steps of:

printing the personalized data in the form of a fused toner directly onto a silicone release coat of a donor release sheet;

positioning the donor release sheet with the side containing the fused toner containing the personalized data in contact with an adhesive receiving surface of a first security laminate;

laminating the donor release sheet and the first security laminate to transfer the personalized data to the adhesive receiving surface of the first security laminate;

removing the donor release sheet from the first security laminate after transfer of the personalized data to the first security laminate;

positioning the adhesive receiving surface of the first security laminate with the personalized data transferred thereto in contact with a first side of the data receiving page;

positioning an adhesive receiving surface of a second security laminate in contact with a second side of the data receiving page; and laminating the first security laminate, the second security laminate and the data receiving page to seal the personalized data on the data receiving page between the first security laminate and the second security laminate.

6. A method of making an identification document having personalized data comprising the steps of:

printing the personalized data in the form of a fused toner directly onto a silicone release coat of a donor release sheet;

positioning the donor release sheet with the side containing the fused toner in contact with an adhesive receiving surface of a first security laminate;

laminating the donor release sheet and the first security laminate to transfer the personalized data to the adhesive receiving surface of the first security laminate;

removing the donor release sheet from the first security laminate after transfer of the personalized data to the first security laminate;

positioning the adhesive receiving surface of the first security laminate with the personalized data transferred thereto in contact with an adhesive receiving surface of a second security laminate; and laminating the first security laminate and second security laminate to seal the personalized data on the first security laminate between the first security laminate and the second security laminate.

7. A method of making a passport having personalized data printed therein, said passport including a cover, a data receiving page attached to the cover, and a security laminate having an adhesive receiving surface, said method comprising the steps of:

printing the personalized data in the form of a fused toner directly onto a silicone release coat of a donor release sheet, controlling the fusing temperature between a minimum level and a maximum level during the step of printing the personalized data;

where the maximum fusing temperature remains below a point that the fused toner becomes brittle upon flexing, and the minimum fusing temperature remains above a point required to adequately fuse the fused toner to the silicon release coat;

positioning the donor release sheet with the side containing the fused toner in contact with the adhesive receiving surface of the security laminate;

laminating the donor release sheet and the security laminate to transfer the personalized data to the adhesive receiving surface of the security laminate;

removing the donor release sheet from the security laminate after transfer of the personalized data to the security laminate; and laminating the security release sheet and data receiving page to seal the personalized data between the security laminate and the data receiving page.

8. A method of making an identification document having personalized data comprising the steps of:

printing the personalized data in the form of a fused toner in reverse image directly onto a silicone release coat of a donor release sheet;

positioning the donor release sheet with the side containing the fused toner in contact with a polymeric data receiving substrate;

laminating the release sheet and the polymeric data receiving substrate to transfer the personalized data in a positive image to the polymeric data receiving substrate;

removing the donor release sheet from the polymeric data receiving substrate after transfer of the personalized data to the data receiving substrate;

positioning the polymeric data receiving substrate containing the personalized data in contact with an adhesive receiving surface of a security laminate; and laminating the security laminate and the polymeric data receiving substrate to seal the personalized data between the security laminate and the polymeric data receiving substrate.

* * * * *

UNITED STATES PATENT AND TRADEMARK OFFICE

CERTIFICATE OF CORRECTION

PATENT NO. : 6,086,707
DATED : July 11, 2000
INVENTOR(S) : Robert A. Waller

It is certified that error appears in the above-identified patent and that said Letters Patent is hereby corrected as shown below:

Title page [56]; please insert the following references cited:

| | | |
|---|---|---|
| 3,237,331 | 03/1966 | Gill, Jr. |
| 3,827,726 | 08/1974 | McVoy, et al. |
| 3,801,183 | 04/1974 | Sevelin, et al. |
| 3,898,086 | 08/1975 | Franer, et al. |
| 3,919,031 | 11/1975 | White |
| 4,099,838 | 07/1978 | Cook, et al. |
| 4,184,701 | 01/1980 | Franklin, et al. |
| 4,287,285 | 09/1981 | Mosehauer |
| 4,298,217 | 11/1981 | Moraw, et al. |
| 4,304,809 | 12/1981 | Moraw, et al. |
| 4,322,461 | 03/1982 | Raphael, et al. |
| 4,325,196 | 04/1982 | Gauch, et al. |
| 4,377,988 | 03/1983 | Tung, et al. |
| 4,383,878 | 05/1983 | Young, et al. |
| 4,425,421 | 01/1984 | Rutges, et al. |
| 4,464,454 | 08/1984 | Vogt |
| 4,467,335 | 08/1984 | Schmidt, et al. |
| 4,496,618 | 01/1985 | Pernicano |
| 4,497,872 | 02/1985 | Hoppe, et al. |
| 4,504,083 | 03/1985 | Devrient, et al. |
| 4,507,346 | 03/1985 | Maurer, et al. |
| 4,507,349 | 03/1985 | Fromson, et al. |
| 4,511,908 | 04/1985 | Small |
| 4,519,155 | 05/1985 | Gallagher, et al. |
| 4,519,632 | 05/1985 | Parkinson, et al. |
| 4,523,777 | 06/1985 | Holbein, et al. |
| 4,531,765 | 07/1985 | Shulman |
| 4,536,013 | 08/1985 | Haghiri-Therani, et al. |
| 4,544,181 | 10/1985 | Maurer, et al. |
| 4,560,426 | 12/1985 | Moraw, et al. |
| 4,564,409 | 01/1986 | Kuhl |
| 4,579,754 | 04/1986 | Maurer, et al. |
| 4,596,409 | 06/1986 | Holbein, et al. |
| 4,629,215 | 12/1986 | Maurer, et al. |
| 4,630,891 | 12/1986 | Li |

UNITED STATES PATENT AND TRADEMARK OFFICE

CERTIFICATE OF CORRECTION

PATENT NO. : 6,086,707
DATED : July 11, 2000
INVENTOR(S) : Robert A. Waller

It is certified that error appears in the above-identified patent and that said Letters Patent is hereby corrected as shown below:

| | | |
|---|---|---|
| 4,635,965 | 01/1987 | Vogt |
| 4,650,283 | 03/1987 | Orensteen, et al. |
| 4,653,775 | 03/1987 | Raphael, et al. |
| 4,663,518 | 05/1987 | Borror, et al. |
| 4,673,626 | 06/1987 | Takeda, et al. |
| 4,688,894 | 08/1987 | Hockert |
| 4,691,993 | 09/1987 | Porter, et al. |
| 4,692,394 | 09/1987 | Drexler |
| 4,710,617 | 12/1987 | Mouchotte |
| 4,713,365 | 12/1987 | Harrison |
| 4,728,983 | 03/1988 | Zwadlo, et al. |
| 4,732,410 | 03/1988 | Holbein, et al. |
| 4,738,949 | 04/1988 | Sethi, et al. |
| 4,748,452 | 05/1988 | Maurer |
| 4,763,985 | 08/1988 | Bingham |
| 4,766,026 | 08/1988 | Lass, et al. |
| 4,765,656 | 08/1988 | Becker, et al. |
| 4,788,122 | 11/1988 | Kawabe, et al. |
| 4,808,509 | 02/1989 | Vermeulen |
| 4,824,142 | 04/1989 | Dossche |
| 4,869,941 | 09/1989 | Ohki |
| 4,889,749 | 12/1989 | Ohashi, et al. |
| 4,894,110 | 01/1990 | Lass, et al. |
| 4,896,943 | 01/1990 | Tolliver, et al. |
| 4,911,478 | 03/1990 | Oshikoshi, et al. |
| 4,928,996 | 05/1990 | Oshikoshi, et al. |
| 4,968,063 | 11/1990 | McConville, et al. |
| 4,900,597 | 01/1990 | Kurtin |
| 4,988,126 | 01/1991 | Heckenkamp, et al. |
| 4,992,353 | 02/1991 | Rodakis, et al. |
| 5,002,312 | 03/1991 | Phillips, et al. |
| 5,011,570 | 04/1991 | Ohbayashi |
| 5,015,724 | 05/1991 | Kawabe |
| 5,080,463 | 01/1992 | Faykish, et al. |
| 5,096,229 | 03/1992 | Carlson |
| 5,106,719 | 04/1992 | Oshikoshi, et al. |

UNITED STATES PATENT AND TRADEMARK OFFICE

CERTIFICATE OF CORRECTION

PATENT NO. : 6,086,707
DATED : July 11, 2000
INVENTOR(S) : Robert A. Waller

It is certified that error appears in the above-identified patent and that said Letters Patent is hereby corrected as shown below:

| | | |
|---|---|---|
| 5,122,813 | 06/1992 | Lass, et al. |
| 5,131,686 | 07/1992 | Carlson |
| 5,135,263 | 08/1992 | Terwel |
| 5,156,937 | 10/1992 | Alexandrovich, et al. |
| 4,370,397 | 01/1993 | Cientrey, et al. |
| 5,213,648 | 05/1993 | Vervloet, et al. |
| 5,244,234 | 09/1993 | Oshima, et al. |
| 5,250,133 | 10/1993 | Kawamura, et al. |
| 5,261,987 | 11/1993 | Luening, et al. |
| 5,264,410 | 11/1993 | Beck, et al. |
| 5,267,755 | 12/1993 | Yamauchi, et al. |
| 5,310,222 | 05/1994 | Chatwin, et al. |
| 5,324,567 | 06/1994 | Bratchley, et al. |
| 5,350,198 | 09/1994 | Bernecker |
| 5,358,582 | 10/1994 | Koshizuka, et al. |
| 5,366,833 | 11/1994 | Shaw, et al. |
| 5,380,044 | 01/1995 | Aitkens, et al. |
| 5,380,695 | 01/1995 | Chiang, et al. |
| 5,387,013 | 02/1995 | Yamauchi, et al. |
| 5,435,599 | 07/1995 | Bernecker |
| 5,658,411 | 08/1997 | Faykish |
| 5,219,183 | 06/1998 | McKillip |

Column 2,
Line 63; after “the”, delete “4F”, and insert –13--.

Signed and Sealed this

Thirty-first Day of July, 2001

Nicholas P. Godici

*Attest:*

NICHOLAS P. GODICI

*Attesting Officer* *Acting Director of the United States Patent and Trademark Office*